United States Patent
Morishita

(10) Patent No.: US 7,995,110 B2
(45) Date of Patent: Aug. 9, 2011

(54) SCAN CONVERSION DEVICE AND ELECTRONIC CAMERA

(75) Inventor: Akihiko Morishita, Hiratsuka (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/654,771

(22) Filed: Dec. 31, 2009

(65) Prior Publication Data

US 2010/0110221 A1   May 6, 2010

Related U.S. Application Data

(62) Division of application No. 11/290,582, filed on Dec. 1, 2005, now Pat. No. 7,663,667.

(30) Foreign Application Priority Data

Dec. 17, 2004  (JP) ................................ 2004-366037

(51) Int. Cl.
   *H04N 5/228*   (2006.01)
   *H04N 5/335*   (2006.01)
   *H04N 1/04*    (2006.01)

(52) U.S. Cl. .................... 348/222.1; 348/273; 348/281; 358/474

(58) Field of Classification Search ............... 348/222.1, 348/273, 281; 382/162; 358/474
   See application file for complete search history.

(56) References Cited

U.S. PATENT DOCUMENTS

| 6,123,261 A | 9/2000 | Roustaei |
| 6,381,371 B1 | 4/2002 | Epstein et al. |
| 7,068,314 B1 | 6/2006 | Nakajima et al. |

FOREIGN PATENT DOCUMENTS

| JP | A-10-164438 | 6/1998 |
| JP | A-2000-312327 | 11/2000 |
| JP | A-2003-324655 | 11/2003 |
| JP | A-2004-260265 | 9/2004 |

OTHER PUBLICATIONS

Nov. 30, 2010 Japanese Office Action issued in Japanese Patent Application No. 2004-366037 (with translation).
Feb. 23, 2011 Japanese Office Action issued in Japanese Patent Application No. 2004-366037 (with translation).
Mar. 1, 2011 Japanese Office Action issued in Japanese Patent Application No. 2004-366037.

*Primary Examiner* — David L Ometz
*Assistant Examiner* — Quang V Le
(74) *Attorney, Agent, or Firm* — Oliff & Berridge, PLC

(57) ABSTRACT

A scan conversion device includes a first buffer unit, a pixel packing unit, a second buffer unit, and a scan output unit. The first buffer unit stores therein pixel signals of the input image on every line in a main scanning direction thereof. The pixel packing unit groups N (N≧2) pixel signals on each line into pixel signal packs according to a predetermined pixel combination rule, and outputs them sequentially. The second buffer unit stores therein the pixel signal packs and aligns them in a second main scanning direction different from the main scanning direction. The scan output unit sequentially outputs the pixel signal packs aligned in the second main scanning direction. According to this configuration, a scan pattern of the input image is changed into a scan pattern of outputting every N output lines in the second main scanning direction.

3 Claims, 11 Drawing Sheets

FIG. 3
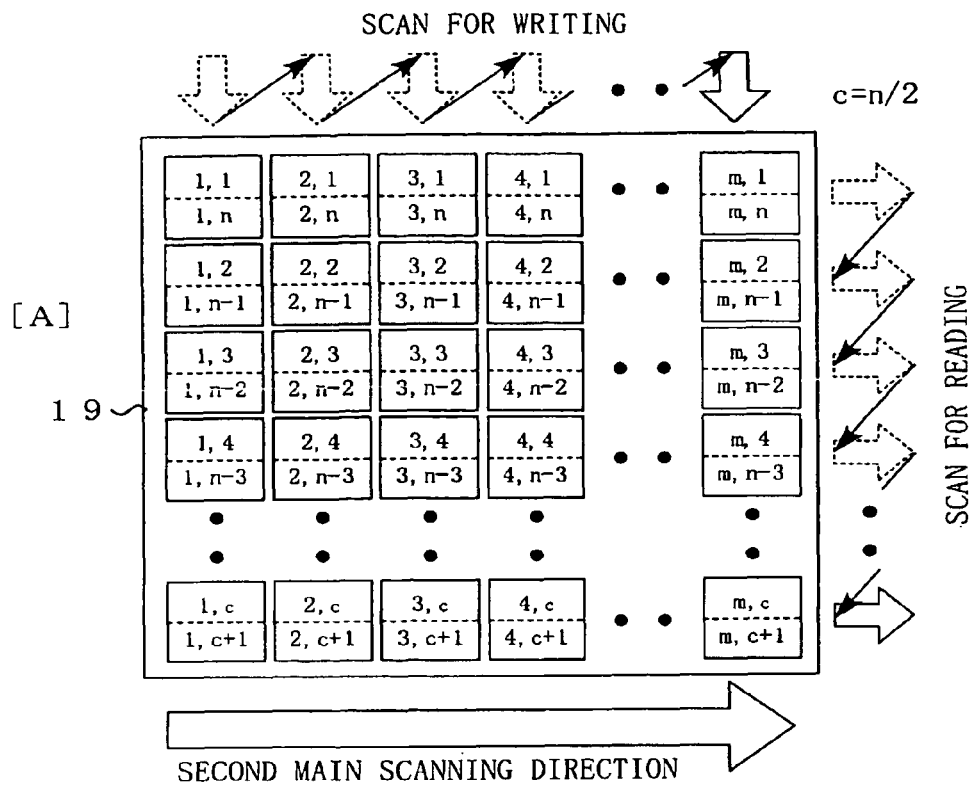
[A]
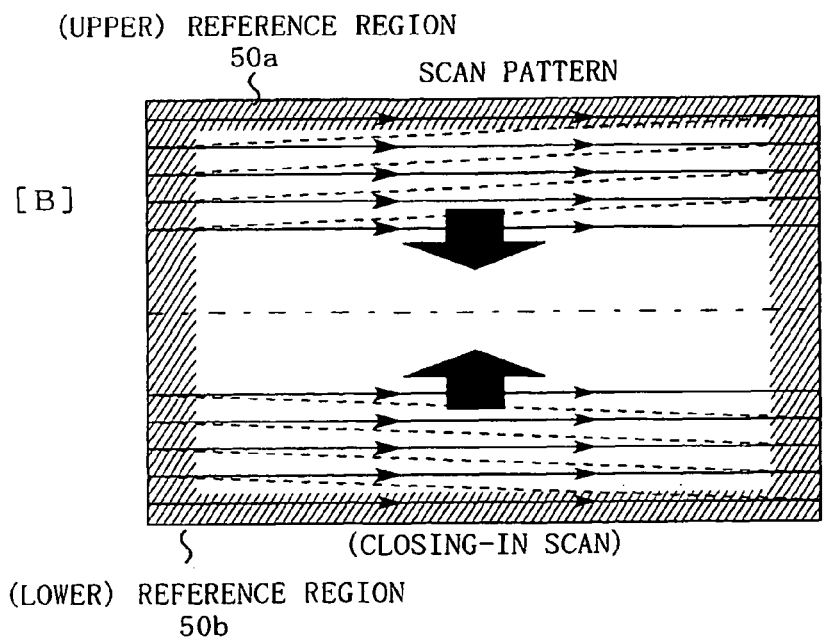
[B]

FIG. 4
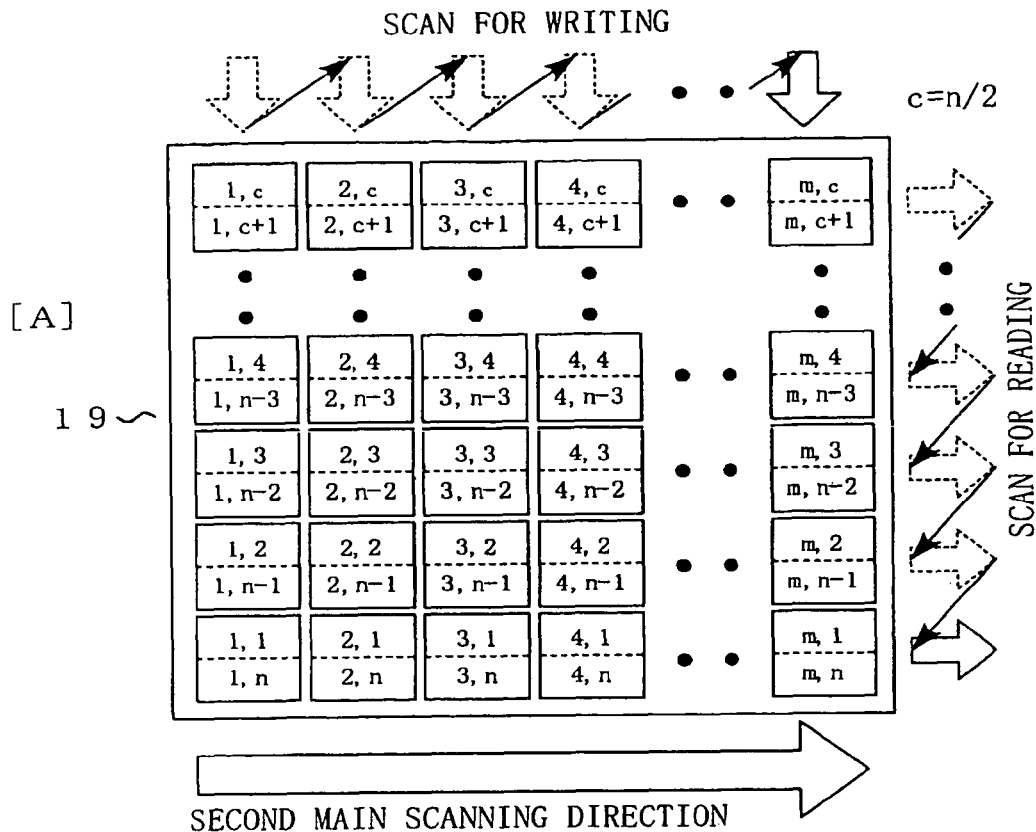
[A]
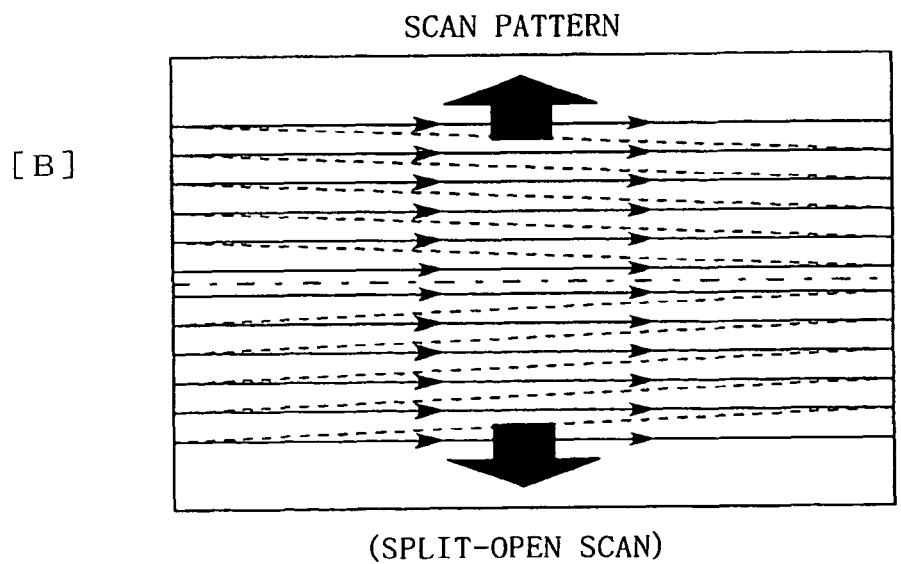
[B]
SCAN PATTERN
(SPLIT-OPEN SCAN)

FIG. 5
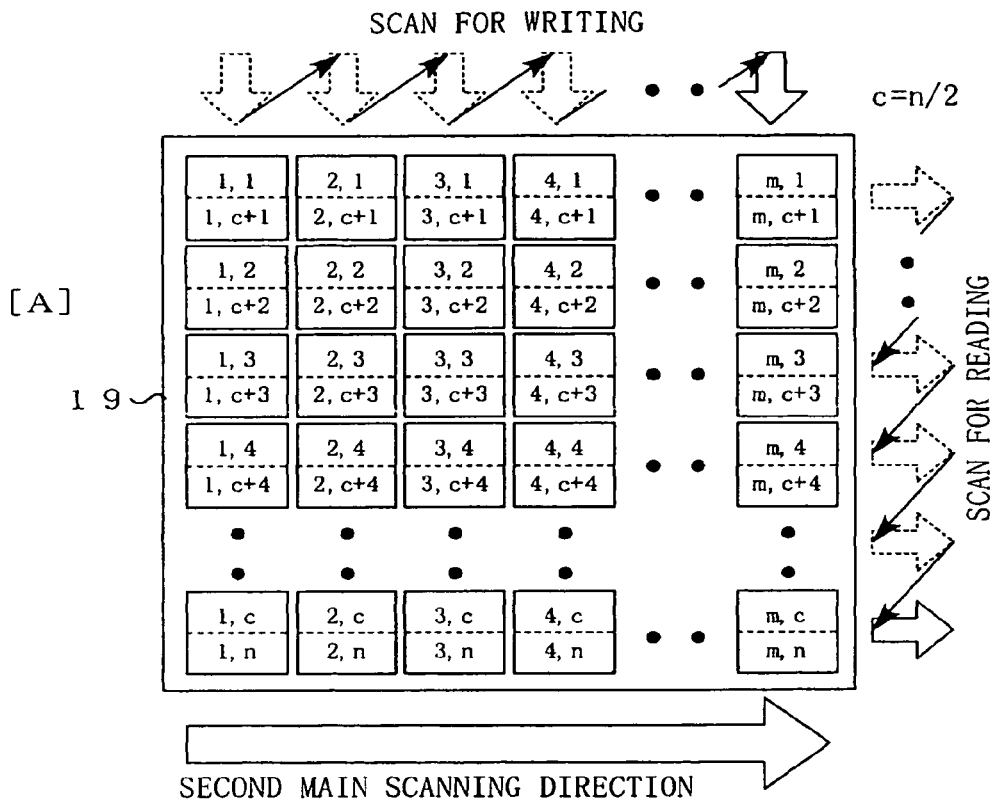
[A]
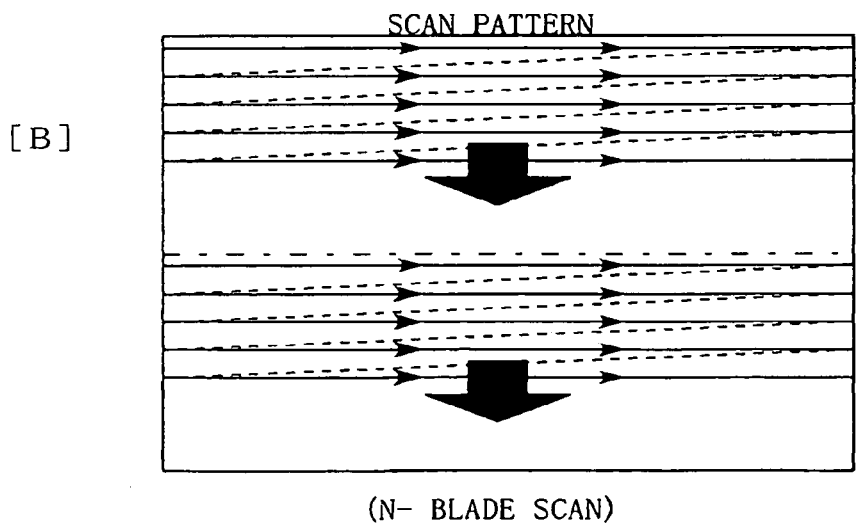
[B]

FIG. 6

| R(1,1) | Gr(2,1) | R(3,1) | Gr(4,1) | ... | R(m-3,1) | Gr(m-2,1) | R(m-1,1) | Gr(m,1) |
| Gb(1,2) | B(2,2) | Gb(3,2) | B(4,2) | ... | Gb(m-3,2) | B(m-2,2) | Gb(m-1,2) | B(m,2) |
| R(1,3) | Gr(2,3) | R(3,3) | Gr(4,3) | ... | R(m-3,3) | Gr(m-2,3) | R(m-1,3) | Gr(m,3) |
| Gb(1,4) | B(2,4) | Gb(3,4) | B(4,4) | ... | Gb(m-3,4) | B(m-2,4) | Gb(m-1,4) | B(m,4) |
| ... | ... | ... | ... | ... | ... | ... | ... | ... |
| Gb(1,c) | B(2,c) | Gb(3,c) | B(4,c) | ... | Gb(m-3,c) | B(m-2,c) | Gb(m-1,c) | B(m,c) |
| R(1,c+1) | Gr(2,c+1) | R(3,c+1) | Gr(4,c+1) | ... | R(m-3,c+1) | Gr(m-2,c+1) | R(m-1,c+1) | Gr(m,c+1) |
| ... | ... | ... | ... | ... | ... | ... | ... | ... |
| R(1,n-1) | Gr(2,n-1) | R(3,n-1) | Gr(4,n-1) | ... | R(m-3,n-1) | Gr(m-2,n-1) | R(m-1,n-1) | Gr(m,n-1) |
| Gb(1,n) | B(2,n) | Gb(3,n) | B(4,n) | ... | Gb(m-3,n) | B(m-2,n) | Gb(m-1,n) | B(m,n) | c=n/2

MAIN SCANNING DIRECTION

FIG. 7

| | | | |
|---|---|---|---|
| chB | 1ST FIELD | R-out | (1, 1)→(1, 3)···→(1, n−3)→(1, n−1)→(5, 1)→(5, 3)···→(m−3, n−3)→(m−3, n−1) |
| | 2ND FIELD | B-out | (2, 2)→(2, 4)···→(2, n−2)→(2, n)→(6, 2)→(6, 4)···→(m−2, n−2)→(m−2, n) |
| chD | 1ST FIELD | Gr-out | (m, n−1)→(m, n−3)···→(m, 3)→(m, 1)→(m−4, n−1)→(m−4, n−3)···→(4, 3)→(4, 1) |
| | 2ND FIELD | Gb-out | (m−1, n)→(m−1, n−2)···→(m−1, 4)→(m−1, 2)→(m−5, n)→(m−5, n−2)···→(3, 4)→(3, 2) |
| chC | 1ST FIELD | Gr-out | (m−2, 1)→(m−2, 3)···→(m−2, n−3)→(m−2, n−1)→(m−6, 1)→(m−6, 3)···→(2, n−3)→(2, n−1) |
| | 2ND FIELD | Gb-out | (m−3, 2)→(m−3, 4)···→(m−3, n−2)→(m−3, n)→(m−7, 2)→(m−7, 4)···→(1, n−2)→(1, n) |
| chA | 1ST FIELD | R-out | (3, n−1)→(3, n−3)···→(3, 3)→(3, 1)→(7, n−1)→(7, n−3)···→(m−1, 3)→(m−1, 1) |
| | 2ND FIELD | B-out | (4, n)→(4, n−2)···→(4, 4)→(4, 2)→(8, n)→(8, n−2)···→(m, 4)→(m, 2) |

SCAN CONVERSION DEVICE AND ELECTRONIC CAMERA

CROSS REFERENCE TO RELATED APPLICATION

This is a Division of application Ser. No. 11/290,582 filed Dec. 1, 2005, which in turn is based upon and claims the benefit of priority from Japanese Patent Application No. 2004-366037, filed on Dec. 17, 2004. The disclosure of the prior application is hereby incorporated by reference herein in its entirety.

BACKGROUND OF THE INVENTION

1. Field of the Invention

The present invention relates to a scan conversion device for converting a scan pattern of an input image. The present invention also relates to an electronic camera that includes the scan conversion device.

2. Description of the Related Art

Recent increase of the number of pixels of an imaging device has caused much increase of time required for reading out data from the pixels thereof. Providing a plurality of number of output channels for the imaging device to heighten a rate of pixel readout is a way to solve this problem.

For example, there is a known technique in which pixel signals from the imaging device are divided in a unit of regions of a screen, scanning lines or color components for parallel and simultaneous readout using a plurality of output channels.

However, there is a problem in using a plurality of output channels that it is required to provide a plurality of paths for transferring the pixel signals in the imaging device, which limits the design of the imaging device in terms of device layout, signal interference, and the like. Thus, an order of main scan or sub-scan of the pixel signals may be reversed for each channel (from/to descending to/from ascending order), for example. For another example, a main scanning direction may be changed from a generally used horizontal direction of a screen to a vertical direction.

As described above, the restriction to the scan pattern causes various troubles in later signal processing. For example, when adjacent pixel signals on the screen are output at different timings, it is not possible to align, in a pipeline way, pixel signals of the minimum processing unit for signal processing. In addition, if a pixel signal required first in signal processing is output later, the signal processing will be delayed.

Note that there is a known exemplary technique disclosed in Japanese Unexamined Patent Application Publication No. 2004-260265 for outputting a serial output of an imaging device in the form of parallel outputs on a pixel block basis.

SUMMARY OF THE INVENTION

It is therefore an object of the present invention to provide a novel technique for converting a scan pattern of an input image.

It is another object of the present invention to add processing of a pixel signal pack (described later) to the scan pattern conversion processing, thereby improving efficiency and speed of the conversion processing.

It is still another object of the present invention to scan and output pixel signals using a converted scan pattern through a plurality of output channels, achieving an increase in a processing rate in later signal processing.

The present invention is now described.

[1] A scan conversion device of the present invention for converting a scan pattern of an input image includes a first buffer unit, a pixel packing unit, a second buffer unit, and a scan output unit. The first buffer unit temporarily stores therein pixel signals of the input image on each read-out line in a main scanning direction of the input image.

The pixel packing unit selects every N ($N \geq 2$) pixel signals from pixel signals on the read-out line in accordance with a predetermined pixel combination rule. The pixel packing unit groups the selected signals into pixel signal packs for output.

The second buffer unit temporarily stores therein the pixel signal packs and aligns them in a second main scanning direction that is different from the main scanning direction.

The scan output unit sequentially scans, for output, the pixel signal packs aligned in the second main scanning direction in the second buffer unit.

According to this configuration, it is possible to change a scan pattern of the input image into a scan pattern in which every N output lines in the second main scanning direction are output.

[2] It is preferable that the pixel packing unit sequentially select pixel signals of pixels located at symmetric positions with respect to a midpoint of the read-out line and group them into the pixel signal packs for output. The scan output unit starts scan output at pixel signals located at both ends of the read-out line, grouped as pixel signal packs and aligned in the second main scanning direction, and continues the scan output of the pixel signal packs sequentially in inward directions of the read-out line.

According to this configuration, it is possible to change the scan pattern of the input image into a scan pattern in which scanning of the output lines starts from both ends of a screen and then continues to move toward a middle of the screen symmetrically (i.e., closing-in scan which moves similarly to a closing double swing door).

[3] It is preferable that the pixel packing unit sequentially select pixel signals located at symmetric positions with respect to a midpoint of the read-out line and group them into the pixel signal packs for output. The scan output unit starts scan output at pixel signals near the midpoint of the read-out line, grouped as the pixel signal packs and aligned in the second main scanning direction, and then continues the scan output of the pixel signal packs sequentially in outward directions of the read-out line.

According to this configuration, it is possible to change the scan pattern of the input image into a scan pattern in which scanning of the output lines starts from pixel signals near the middle of the screen and then continues to move toward both ends of the screen symmetrically (i.e., split-open scan which moves similarly to an opening double swing door).

[4] It is preferable that the pixel packing unit select N pixel signals from pixels on the read-out line at a predetermined interval and group them into pixel signal packs for output. The scan output unit sub-scans, in one direction of the read-out line, scan outputs of the pixel signal packs aligned in the second main scanning direction.

According to this configuration, it is possible to change the scan pattern of the input image into a scan pattern in which N divided regions in the screen are scanned for output in parallel (i.e., N-blade scan which moves similarly to a N-blade razor skimming the screen).

[5] It is also preferable that the pixel signals be color signals each containing color information.

[6] An electronic camera of the present invention includes the above-mentioned scan conversion device and an imaging unit photoelectrically converting an image of a subject and reading out pixel signals. In this electronic camera, the scan conversion device converts a scan pattern of the pixel signals read out from the imaging unit.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIGS. 3A and 3B show a process for converting a scan pattern into a pattern of closing-in scan;

FIGS. 4A and 4B show a process for converting a scan pattern into a pattern of split-open scan;

FIGS. 5A and 5B show a process for converting a scan pattern into a pattern of N-blade scan;

FIG. 6 shows a pixel arrangement in an imaging device 13;

FIG. 7 shows four scan outputs chA to chD of the imaging device 13;

DESCRIPTION OF THE PREFERRED EMBODIMENTS

Preferred embodiments of the present invention are now described in detail with reference to the drawings.

Embodiment 1

Figure 1:
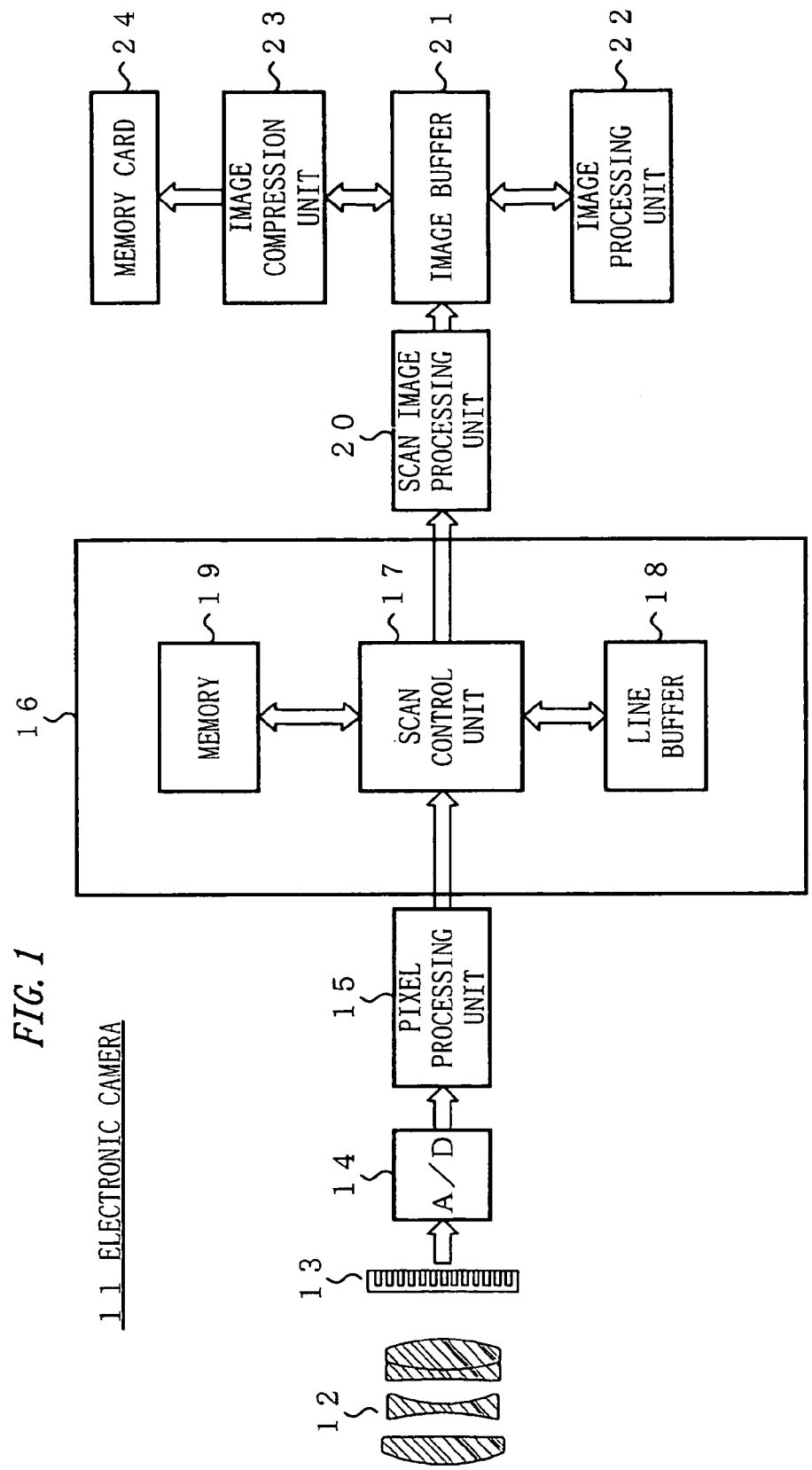
FIG. 1 shows the configuration of an electronic camera 11.

FIG. 1 shows the configuration of an electronic camera 11.

Referring to FIG. 1, a lens 12 is mounted on the electronic camera 11. A light-receiving surface of an imaging device 13 is arranged in an image space of the lens 12. Pixel signals output from the imaging device 13 are converted into digital signals by an A/D converter 14 and are then input to a pixel processing unit 15 sequentially. The pixel processing unit 15 performs one or more processings feasible for each one of the pixel signals independently (e.g., correction for a defective pixel) in a pipeline manner. The thus processed pixel signals are input to a scan conversion device 16.

The scan conversion device 16 includes a scan control unit 17, a line buffer 18, and a memory 19. The line buffer 18 temporarily stores pixel signals corresponding to a read-out line in a main scanning direction of the imaging device 13. The memory 19 is a buffer which can be read from and written to at least on a pixel signal pack basis (described later). The scan control unit 17 converts a scan pattern of pixel signals input thereto by using the above configuration.

An output of the scan conversion device 16 is input to a scan image processing unit 20. The scan image processing unit 20 sequentially performs one or more processings in pixel scanning order (e.g., arithmetic processing referring to an adjacent pixel, or OB clamp).

The pixel signals for which the above processes are finished are temporarily stored in an image buffer 21. An image processing unit 22 performs two-dimensional image processing (e.g., color interpolation or edge enhancement) for the pixel signals in the image buffer 21. An image compression unit 23 performs image compression for the pixel signals after the image processing, and then records these pixel signals in a memory card 24.

[Process for Generating Pixel Signal Packs]

Next, a process for generating pixel signal packs is described. This process is a feature of the first embodiment.

Figure 2:
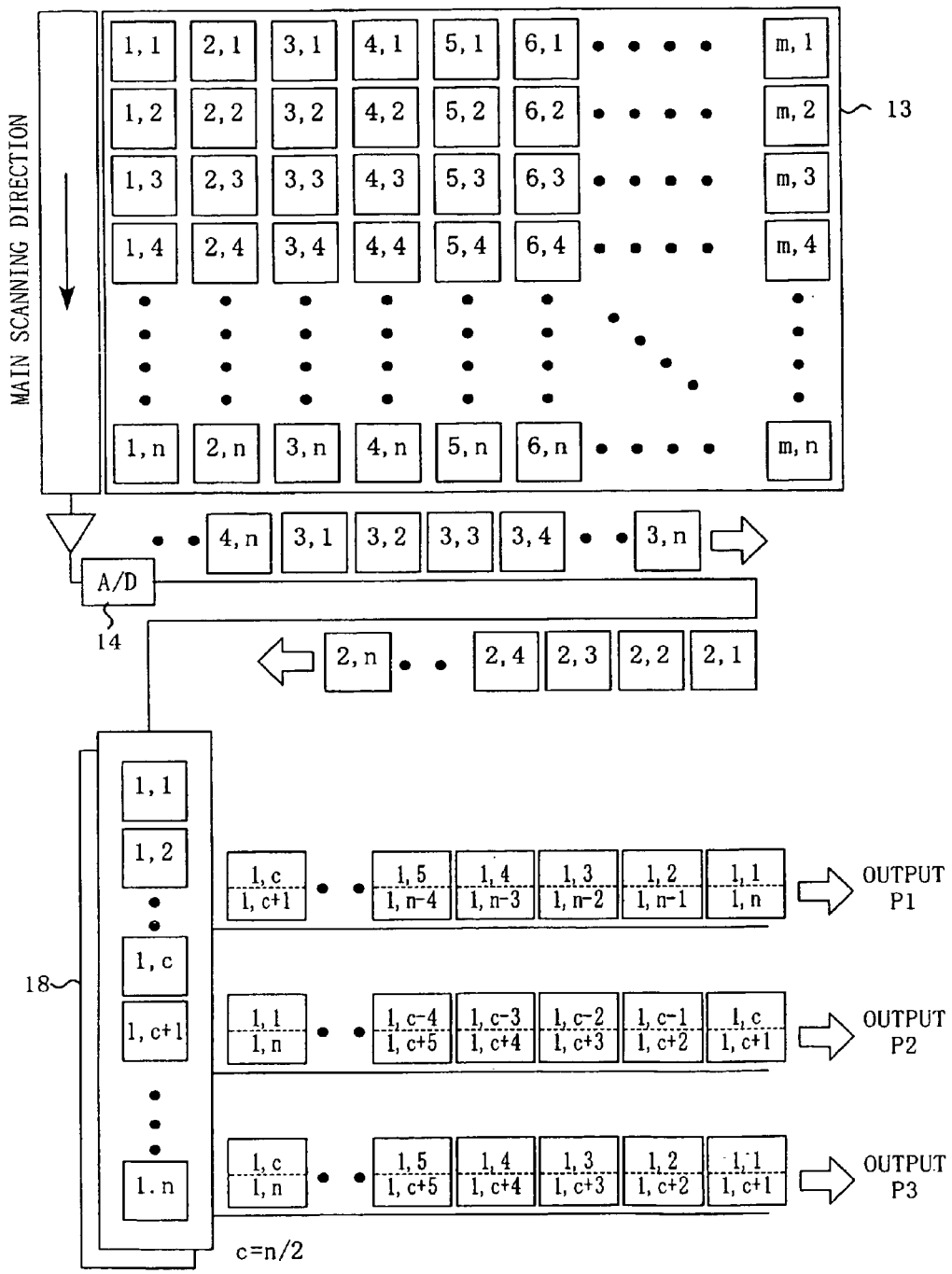
FIG. 2 shows a process for generating pixel signal packs.

FIG. 2 shows the process for generating pixel signal packs (a signal flow) in the first embodiment.

Photoelectric conversion is performed for an image of a subject on a pixel to pixel basis on the light-receiving surface of the imaging device 13, so that pixel signals of n pixels in a vertical direction×m pixels in a horizontal direction are generated. The pixel signals are sequentially read out from the imaging device 13 with the vertical direction regarded as a main scanning direction.

The thus read pixel signals are sequentially input to the scan conversion device 16 through the A/D converter 14 and the image processing unit 15. The scan control unit 17 of the scan conversion device 16 inputs these pixel signals to the line buffer 18 on a read-out line basis. One read-out line is formed of one vertical line of pixels (n pixels). The line buffer 18 temporarily stores the thus input pixel signals.

The scan control unit 17 reads out N (N=2 in this example) pixel signals from the line buffer 18 and generates a pixel signal pack. The pixel signal pack is a group of N pixel signals as a unit that can be transferred in block. The generation of the pixel signal pack can be achieved by a bit packing process, for example.

Outputs P1 to P3 in FIG. 2 represent examples of the generation of pixel signal packs.

In the output P1, pixel signals of pixels located at symmetric positions with respect to a midpoint of the read-out line (i.e., a midpoint between the c-th pixel and (c+1)th pixel where c=n/2) are sequentially grouped. In this manner, pixel signal packs are sequentially generated. First, a pixel signal pack of pixel signals of pixels (1, 1) and (1, n) located at both ends of the read-out line is output. Then, pixel signal packs of pixel signals of inner pixels are sequentially output. Finally, a pixel signal pack of pixel signals of pixels located at the center of the read-out line, i.e., pixels (1, c) and (1, c+1) is output.

In the output P2, pixel signals of pixels located at symmetric positions with respect to the midpoint of the read-out line are grouped in a similar manner to that of the output P1, thereby generating pixel signal packs. However, the order of outputting the pixel signal packs in the output P2 is reversed from that in the output P1. First, the pixel signal pack of the pixel signals of pixels (1, c) and (1, c+1) that are located at the center of the read-out line is output. Then, the pixel signal packs of pixel signals of outer pixels are sequentially output until the pixel signal pack of the pixel signals of pixels (1, 1) and (1, n) that are located at both ends of the read-out line is output.

On the other hand, in the output P3, pixel signals are selected and grouped at a predetermined interval (c in this example) from the read-out line so as to generate a pixel signal pack. The pixel signal packs generated in this manner are sequentially output.

It is preferable that the scan conversion device 16 include a plurality of (e.g., two) line buffers 18 for which reading and writing can be independently performed. In this case, during a period in which one of the line buffers 18 outputs the pixel signal packs, pixel signals of the next line can be stored in the other line buffer 18. By sequentially exchanging roles of the line buffers 18 in this manner, it is possible to read and write pixel signals without delay.

[Conversion Process of a Scan Pattern]

The scan control unit 17 scans and writes the pixel signal packs generated through the line buffer 18 into the memory 19, and stores only as many the pixel signal packs as necessary to perform conversion of a scan pattern in the memory 19.

Then, the scan control unit 17 scans and reads out the pixel signal packs from the memory 19 in a different scan pattern from the pattern of the write scan. The scan pattern is converted according to a difference between scanning paths for write scan and for read scan.

It is preferable that the scan conversion device 16 include a plurality of (e.g., two) memories 19 for which reading and writing can be performed independently. In this case, during a period in which the read scan is performed for one of the memories 19, the write scan for pixel signal packs of the next screen can be performed for the other memory 19. By sequentially exchanging roles of the memories 19 in this manner, it is possible to perform the read and write scans for the pixel signal packs without delay.

It is preferable that the memory 19 be a memory for which reading and writing can be performed by burst transfer. In this case, time required for converting a scan pattern can be shortened by using burst transfer in the read and/or write scan.

Next, exemplary manners of conversion of a scan pattern are described based on specific examples.

[1] Closing-in Type Scan

FIGS. 3A and 3B show a process for converting a scan pattern into a pattern of closing-in scan.

The scan control unit 17 scans and writes pixel signal packs for one screen, that are obtained by grouping pixel signals of pixels located at symmetrical positions (e.g., pixel signal packs in the output P1 or P2 in FIG. 2), into the memory 19.

In this manner, (n/2) scan lines each containing m pixel signal packs aligned in the horizontal direction are obtained in the memory 19. The scan control unit 17 scans the memory 19 for reading, as shown in FIG. 3A. That is, the scan control unit 17 reads out the (n/2) scan lines in an order from pixel signal packs of pixel signals of pixels located at upper and lower ends of the screen to pixel signal packs corresponding to pixels located at the center.

As a result of the read scan, a scan pattern is achieved in which scan of output lines starts from upper and lower ends of the screen and symmetrically progresses toward the middle of the screen (i.e., a pattern of closing-in scan which moves similarly to a closing double swing door), as shown in FIG. 3B.

[2] Split-open Scan

Next, a process for converting a scan pattern into a pattern of split-open scan is described as another exemplary conversion of the scan pattern.

FIGS. 4A and 4B show this conversion process.

The scan control unit 17 scans and writes pixel signal packs for one screen, that are obtained by grouping pixel signals of pixels located at symmetrical positions (e.g., pixel signal packs in the output P1 or P2 in FIG. 2), into the memory 19.

In this manner, (n/2) scan lines each containing m pixel signal packs aligned in the horizontal direction are obtained in the memory 19. The scan control unit 17 performs scan for reading for the memory 19, as shown in FIG. 4A. That is, the scan control unit 17 reads out the (n/2) scan lines in an order from pixel signal packs of pixel signals of pixels located at the middle of the screen to pixel signal packs of pixel signals of pixels located at upper and lower ends.

As a result of the read scanning, a scan pattern is achieved in which scanning of output lines starts from the middle of the screen and symmetrically continues to move upwards and downwards (i.e., a pattern of split-open scan which moves similarly to an opening double swing door), as shown in FIG. 5B.

[3] N-blade Scan

Next, a process for converting a scan pattern into a pattern of N-blade scan is described as another exemplary conversion of the scan pattern.

FIGS. 5A and 5B show this process.

The scan control unit 17 scans and writes pixel signal packs for one screen, that are obtained by grouping pixel signals at a predetermined interval (i.e., pixel signal packs in the output P3 in FIG. 2), into the memory 19.

In this manner, (n/2) scan lines each containing m pixel signal packs aligned in the horizontal direction are obtained in the memory 19. The scan control unit 17 performs scan for reading for the memory 19, as shown in FIG. 5A. That is, the (n/2) scan lines are read out in an order from pixel signal packs of pixel signals of upper pixels in the screen to pixel signal packs of pixel signals of lower pixels.

As a result of the read scanning, a scan pattern is achieved in which scanning is performed for each of divided regions of the screen (i.e., a pattern of N-blade scan which moves similarly to a N-blade razor skimming the screen), as shown in FIG. 5B.

Effects of the First Embodiment and Others

As described above, pixel signal packs are generated by grouping N (N=2 in this example) of n pixel signals of pixels in a vertical line in the first embodiment. After the packing process, the number of signals to be processed (i.e., the number of the pixel signal packs) is reduced to 1/N times. This reduction increases time margin of the process for converting a scan pattern. Therefore, the scan conversion device 16 can be achieved that can accept an imaging device 13 having high resolution (a large number of pixels).

Moreover, in the first embodiment, each of the pixel signal packs is generated by grouping N pixel signals in the main scanning direction of the imaging device 13. The thus generated pixel signal packs are grouped in the second main scanning direction and are scanned and output. This process can provide a scan pattern that enables the use of N output lines. Since the use of a plurality of output lines is enabled, it is also possible to perform signal processing later by using a plurality of lines. Thus, it is easy to increase a rate of signal processing in the electronic camera 11.

In the closing-in scan, the output lines at both ends (upper and lower ends in this example) of the screen are output first. Generally, there are reference regions 50a and 50b typified by optical black regions at both ends of a screen, as shown in FIG. 3B. With conventional scan pattern, it is impossible to obtain signals of the reference regions 50a and 50b located at both ends in the sub-scanning direction of the screen together in advance of pixel signals of an effective pixel region. However, when closing-in scan is performed as described above, it is possible to obtain the signals of the reference regions 50a and 50b together in advance of the signals of the effective pixel signal. Thus, before the effective pixel region is scanned and output, selection whether the reference regions 50a and 50b are used or not, signal processing of the reference regions 50a and 50b, and the like can be performed.

Embodiment 2

Next, the imaging device 13 in the electronic camera 11 scans the pixel signals and outputs them on a plurality of channels.

FIG. 6 shows a pixel arrangement in an imaging device 13. The imaging device 13 generates pixel signals of n pixels in the vertical direction×m pixels in the horizontal direction. The pixel signal is a color signal containing information on one of colors, Gr, Gb, R, and B. These colors are arranged in a bayer pattern.

FIG. 7 shows four scan outputs chA, chB, chC, and chD of the imaging device 13.

As shown in FIG. 7, the imaging device 13 divides pixel signals of the pixels arranged as shown in FIG. 6 into a first field formed of R lines and Gr lines and a second field formed of Gb lines and B lines and reads the pixel signals out by sequentially reading the first field and the second field, i.e., performing reading twice.

R components of the first field are divided into two groups that are respectively read out on two scan outputs chA and chB in parallel at the same time. Gr components of the first field are divided into two groups that are respectively read out on two scan outputs chC and chD in parallel at the same time.

Similarly, B components of the second field are divided into two groups that are respectively read out on two scan outputs chA and chB in parallel at the same time. Gb components of the second field are divided into two groups that are respectively read out on two scan outputs chC and chD in parallel at the same time.

Scan patterns for the scan outputs chA to chD are determined in accordance with the following rules.

chA: Pixel signals are output in an order from a lower pixel in a screen to an upper pixel (in main scan). This main scan is repeated from left to right in the screen (in sub-scan).

chB: Pixel signals are output in an order from an upper pixel in the screen to a lower pixel (in main scan). This main scan is repeated from left to right in the screen (in sub-scan).

chC: Pixel signals are output in an order from an upper pixel in the screen to a lower pixel (in main scan). This main scan is repeated from right to left in the screen (in sub-scan).

chD: Pixel signals are output in an order from a lower pixel in the screen to an upper pixel (in main scan). This main scan is repeated from right to left in the screen (in sub-scan).

[Process for Generating Pixel Signal Packs]

Next, a process for generating pixel signal packs is described. This process is a feature of the second embodiment.

Figure 8:
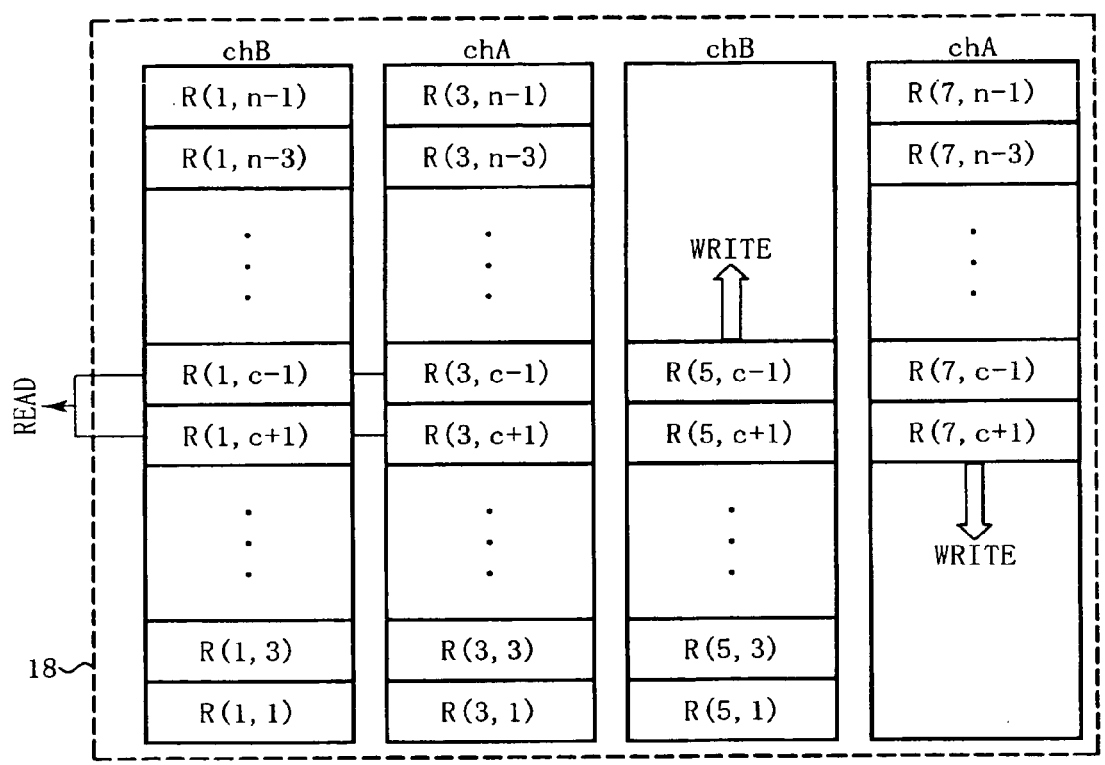
FIG. 8 shows a process for generating pixel signal packs for an R component.

FIG. 8 shows the process for generating pixel signal packs for the R component.

As shown in FIG. 8, generation of the pixel signal packs of the R components uses line buffers 18 corresponding to four read-out lines.

The scan control unit 17 writes the pixel signals of the R component (chA and chB) in the line buffers 18 for two lines.

Then, the scan control unit 17 reads out pixel signals of pixels located at symmetric positions with respect to a midpoint of the read-out line (i.e., a midpoint between the c-th pixel and the (c+1)th pixel) from the line buffers 18 for two lines and groups the thus read pixel signals. The groups of the pixel signals are sequentially output as pixel signal packs.

The scan control unit 17 writes the next pixel signals of the R components (chA and chB) into the line buffers 18 for the remaining two lines in parallel with the above reading operation of the pixel signal packs.

By exchanging roles of the line buffers 18 so as to alternately read and write, it is possible to process the pixel signals of the R component (chA and chB) output from the imaging device 13 without delay.

Figure 9:
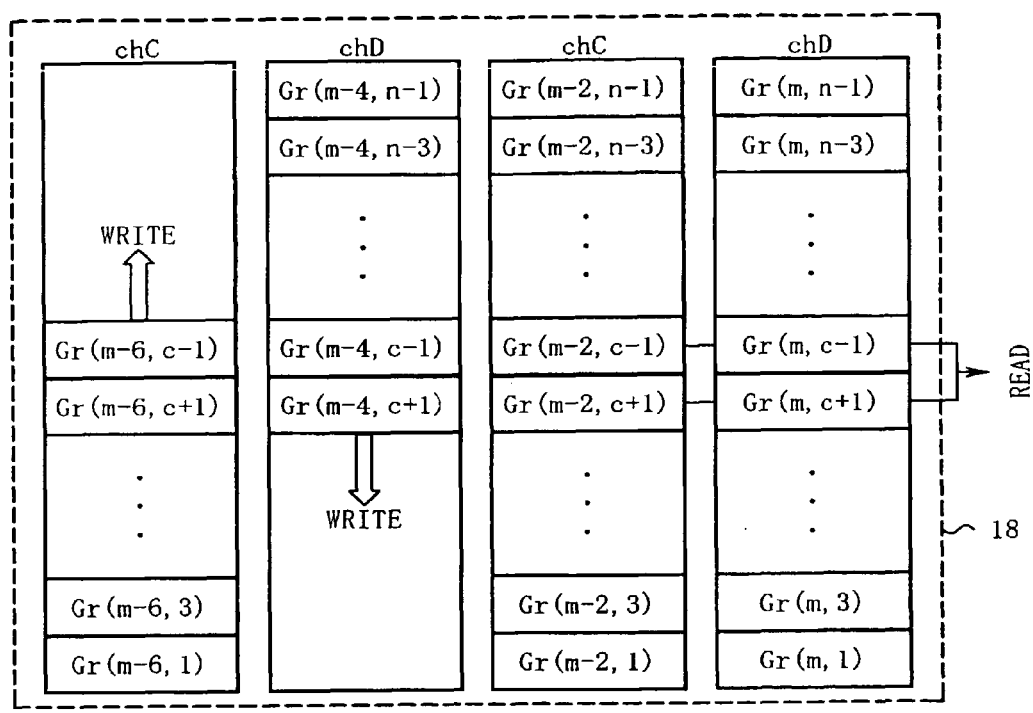
FIG. 9 shows a process for generating a pixel signal packs for a Gr component.

FIG. 9 shows the process for generating pixel signal packs for the Gr component. The process for the Gr component is performed in a similar manner to that for the R component described above. Therefore, the description of the process for the Gr component is omitted here.

[Conversion Process of a Scan Pattern]

Figure 10:
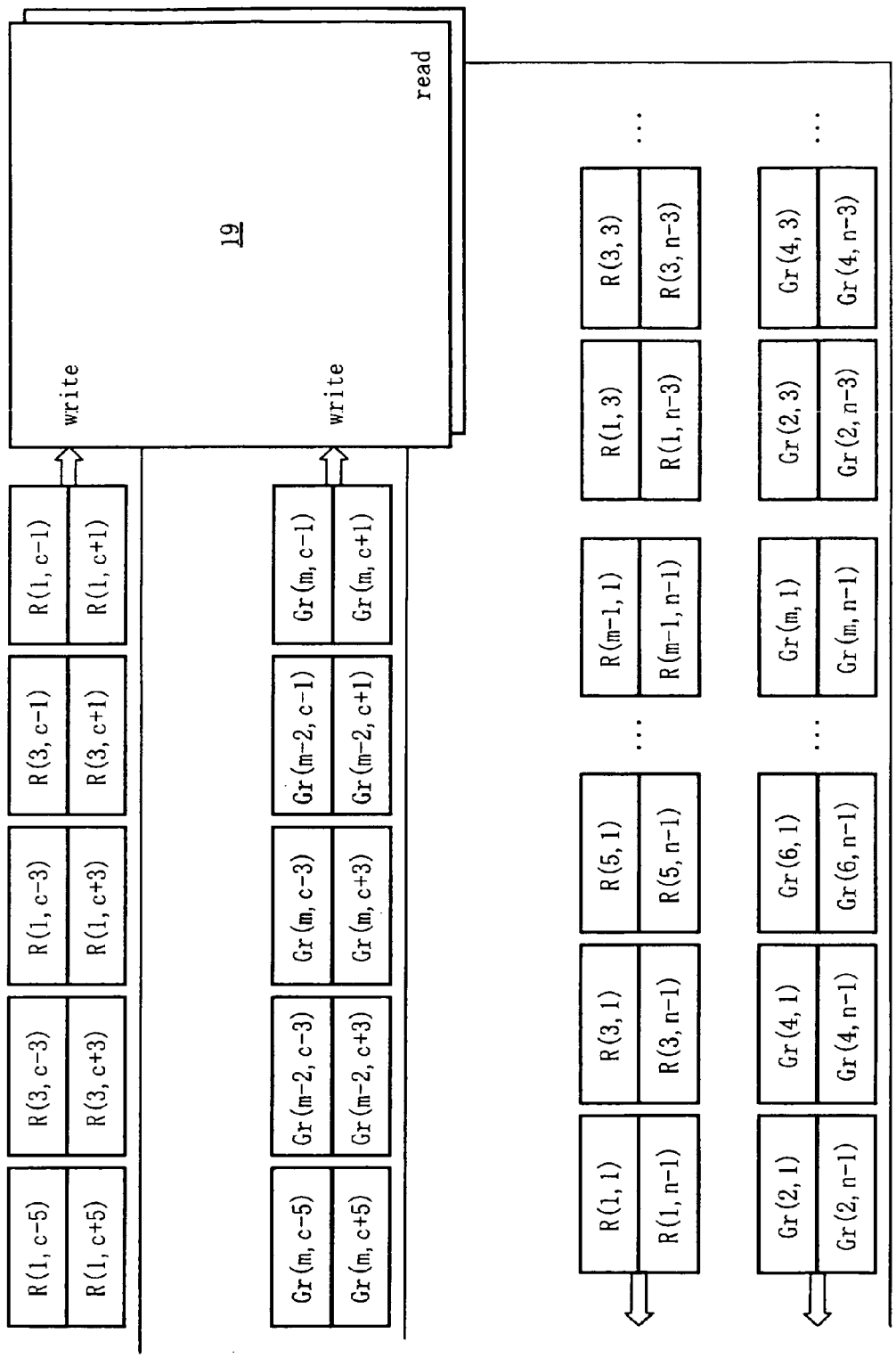
FIG. 10 shows a process for converting a scan pattern.

FIG. 10 shows a process for converting a scan pattern. The scan control unit 17 scans and writes the pixel signal packs of the R component and the pixel signal packs of the Gr component that are generated in the above manner into the memory 19. Then, the scan control unit 17 scans and reads out the pixel signal packs from the memory 19 in a different scan pattern from the pattern of the write scan. The scan pattern is converted according to a difference between scan paths for write scan and for read scan.

The scan control unit 17 rearranges the thus read pixel signal packs in such a manner that the R component and the Gr component are alternately arranged, and outputs the rearranged pixel signal packs to the scan image processing unit 20 provided in the latter part.

Two memories 19 may be used so as to independently perform conversion of the scan pattern of the R component and conversion of the scan pattern of the Gr component. Moreover, two other memories 19 may be further added so as to exchange their roles and alternately perform scan for writing of the first field and read scan for the second field.

Figure 11:
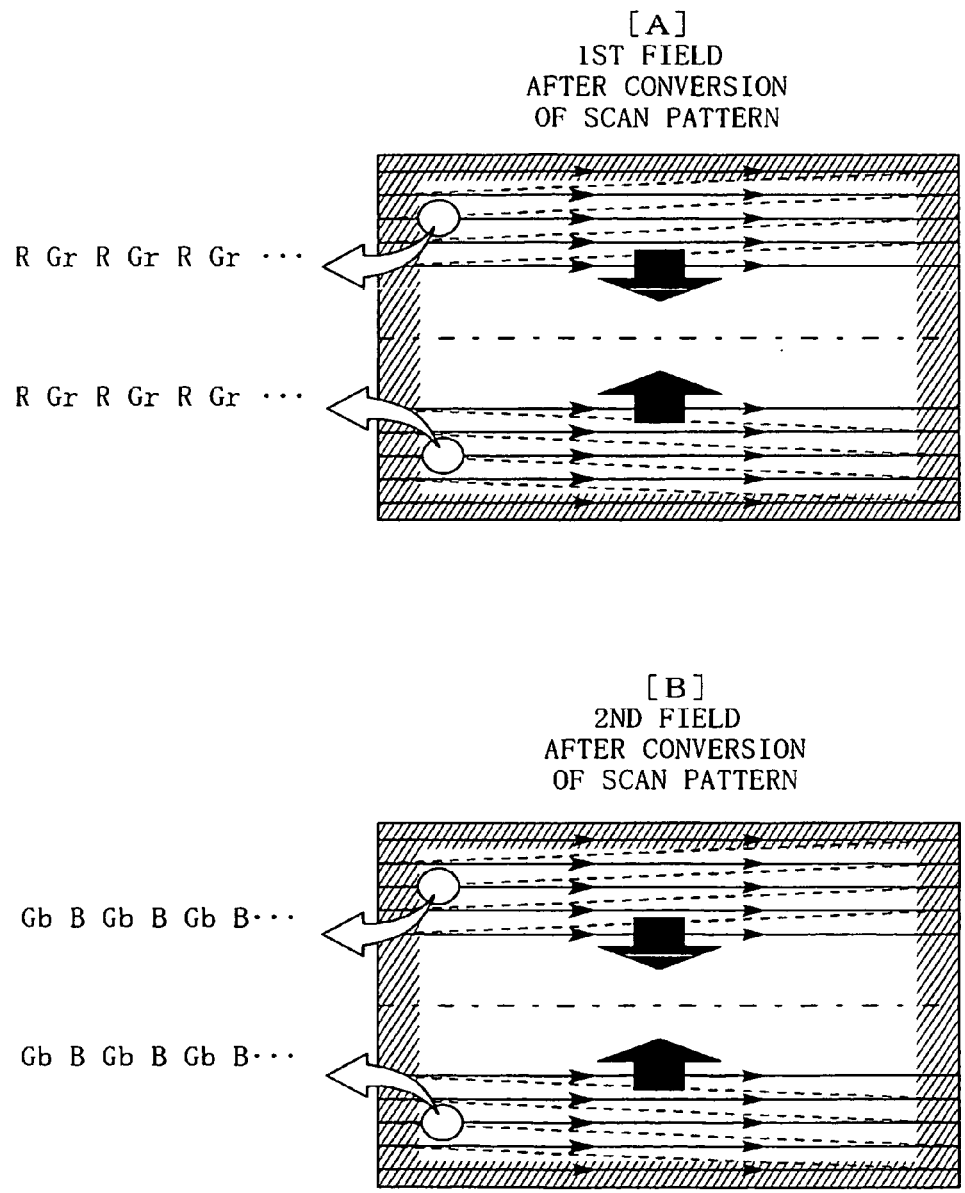
FIGS. 11A and 11B show an exemplary converted scan pattern.

A series of the processes described above can convert the scan patterns of the scan outputs chA to chD of the imaging device 13, thereby converting the first field into a scan pattern shown in FIG. 11A.

FIG. 11B shows a pattern obtained by converting the scan pattern of the second field. The process for the second field is the same as that for the first field described above. Therefore, the description of the process for the second field is omitted here.

Although FIGS. 11A and 11B show an example of converting a scan pattern into a pattern of closing-in scan, the second embodiment is not limited thereto. In the second embodiment, it is possible to perform conversion of a scan pattern into various patterns, e.g., a pattern of split-open scan and a pattern of N-blade scan, by performing the methods described in the first embodiment.

Effects of the Second Embodiment and Others

As described above, the same effects as those obtained in the first embodiment can be also obtained in the second embodiment.

Especially, in the second embodiment, it is possible to orderly process the scan outputs chA to chD of the imaging device 13 that contain information on a plurality of colors, thereby converting a complicated scan pattern that is intrinsic to an imaging device into a plain scan pattern suitable for signal processing. Therefore, by providing the scan conversion device 16 of the second embodiment in the electronic camera 11, processing of pixel signals after conversion can be made simple and plain.

Supplement of the Embodiments

In the above embodiments, a case is described in which two pixel signals are grouped into a single pixel signal pack. However, the present invention is not limited thereto. For example, three or more pixel signals may be grouped into a single pixel signal pack. Grouping three or more pixel signals can realize more scan patterns. For example, it is possible to divide a screen into N regions and perform N-blade scan for the N divided regions while performing closing-in scan or split-open scan in each region.

Moreover, in the above embodiments, the main scanning direction of the imaging device 13 is the vertical direction in the screen and the second main scanning direction after conversion of a scan pattern is the horizontal direction in the screen. However, the present invention is not limited thereto. The main scanning direction of the imaging device 13 may be the horizontal direction in the screen and the second main scanning direction after conversion of a scan pattern may be the vertical direction in the screen. Moreover, it is possible to flexibly treat conversion of a scan pattern of pixels in a honeycomb arrangement by appropriately setting the main scanning direction and the second main scanning direction, for example.

Furthermore, a scan pattern of an image taken by the imaging device 13 is converted in the above embodiments. However, the present invention is not limited thereto. For example, a scan pattern may be converted for a partial image (e.g., a cropped image) of the image taken by the imaging device 13. Moreover, a scan pattern of an input image (e.g., an image obtained by scanning a film) may be converted by mounting the scan conversion device 16 of the present invention onto a scanner.

In the aforementioned embodiments, the pixel signal packs may be transferred by parallel transfer or serial transfer in the scan conversion device 16.

Principles of the Embodiments

In order to easily apply the present invention to other embodiments, principles of the above embodiments is now described.

(1) In the embodiment, an input image is temporarily stored on a read-out line basis. The read-out lines extend in the main scanning direction. N pixel signals are sequentially selected from the read-out line in accordance with a predetermined pixel combination rule. Pixel signal packs each containing N pixel signals are sequentially output.

This process can reduce the number of the pixel signal packs to be processed to n/N where the number of pixels in each read-out line is n. Thus, when a sufficient transfer bandwidth for the pixel signal pack (corresponding to N pixel signals) is ensured, margin of an internal sequence in the scan conversion device is increased by the amount corresponding to reduction in the number of transfers.

Then, in the embodiment, these pixel signal packs are temporarily stored and are aligned in a direction different from the main scanning direction (i.e., the second main scanning direction). The pixel signal packs aligned in the second main scanning direction are scanned and output in a predetermined order.

This process converts the main scanning direction intrinsic to the input image into the second main scanning direction. Moreover, since the pixel signal packs each containing N pixel signals are output in this process, a scan pattern can be achieved in which N output lines in the second main scanning direction are output in parallel. By employing the scan pattern that enables the use of a plurality of lines, it is possible to easily shorten time required for scan and easily perform signal processing later by using a plurality of lines (i.e., perform the signal processing in parallel).

(2) The configuration in the above embodiments can provide various types of scan patterns by appropriately setting a rule for generating the pixel signal packs and an order of outputting the pixel signal packs.

For example, the pixel signal pack is generated by combining pixel signals that correspond to symmetric pixels with respect to a midpoint of a read-out line with each other. The pixel signal packs are then aligned in the second main scanning direction and are output in such a manner that pixel signal packs formed of pixel signals at both ends are output first. Then, pixel signal packs formed of pixel signals inwardly adjacent to the one at both ends are sequentially output.

By setting a scan output operation in this manner, it is possible to achieve a scan pattern in which scanning lines respectively starting from both ends of a screen come close to each other toward the middle of the screen (i.e., a pattern of closing-in scan).

(3) Moreover, the pixel signal pack is generated by combining pixels located at symmetric positions with respect to the midpoint of the read-out line, for example. The pixel signal packs are then aligned in the second main scanning direction for output in such a manner that the scan output starts at pixel signal packs at the center and then it continues sequentially in outward directions.

By setting the scan output operation in this manner, it is possible to achieve a scan pattern in which the scanning lines starting from the middle of the screen gets away from each other toward both ends of the screen (i.e., a pattern of split-open scan).

(4) Another scan pattern can be also obtained.

For example, N pixel signals selected from the read-out line at a predetermined interval are grouped into a pixel signal pack. The pixel signal packs are then aligned in the second main scanning direction and are sequentially scanned and output.

By setting the scan output operation in this manner, it is possible to achieve a scan pattern in which N scanning lines that are away from each other at a predetermined interval progress toward one direction together (i.e., a pattern of N-blade scan).

(5) In the embodiment, the pixel signal may be a color signal containing a signal of information on color of a corresponding pixel. In this case, a scan pattern of a color input image can be converted.

(6) An electronic camera of the embodiment includes the aforementioned scan conversion device. This scan conversion device can convert a scan pattern obtained by an imaging unit into a scan pattern suitable for processing in the electronic camera.

The invention is not limited to the above embodiments and various modifications may be made without departing from the spirit and scope of the invention. Any improvement may be made in part or all of the components.

The invention claimed is:

1. A scan conversion device converting a scan pattern of an input image, comprising:
   a first buffer unit temporarily storing therein a pixel signal of the input image on each read-out line in a main scanning direction of the input image;
   a pixel packing unit selecting every N (N≧2) pixel signals from pixel signals on the read-out line and grouping them, for output, into pixel signal packs in accordance with a predetermined pixel combination rule;
   a second buffer unit temporarily storing therein the pixel signal packs and aligning them in a second main scanning direction that is different from the main scanning direction; and
   a scan output unit sequentially scanning, for output, the pixel signal packs aligned in the second main scanning direction in said second buffer unit, wherein
   a scan pattern of the input image is changed into a scan pattern in which every N output lines in the second main scanning direction are output, wherein said pixel packing unit selects every N pixel signals from pixels on the read-out line at a predetermined interval and groups them into pixel signal packs for output;

said scan output unit sub-scans scan outputs of the pixel signal packs in one direction of the read-out line, the pixel signal packs being aligned in the second main scanning direction; and through the operations of said pixel packing unit and said scan output unit, the scan conversion device achieves a scan pattern in which N divided regions in a screen are scanned for output in parallel.

2. The scan conversion device according to claim 1, wherein:
the pixel signals are color signals each containing color information.

3. An electronic camera comprising:
a scan conversion device according to claim 1; and
an imaging unit photoelectrically converting an image of a subject and reading out pixel signals, wherein
said scan conversion device converts a scan pattern of the pixel signals read out from said imaging unit.

* * * * *